(12) United States Patent
Brammer et al.

(10) Patent No.: US 8,882,885 B2
(45) Date of Patent: Nov. 11, 2014

(54) SYSTEM TO REMOVE DISSOLVED GASES SELECTIVELY FROM LIQUIDS

(75) Inventors: Ulrich Brammer, Berlin (DE); Johannes Seiwert, Berlin (DE); Christiane Gottschalk, Berlin (DE)

(73) Assignee: MKS Instruments, Inc., Andover, MA (US)

( * ) Notice: Subject to any disclaimer, the term of this patent is extended or adjusted under 35 U.S.C. 154(b) by 266 days.

(21) Appl. No.: 13/421,346

(22) Filed: Mar. 15, 2012

(65) Prior Publication Data

US 2012/0279396 A1 Nov. 8, 2012

Related U.S. Application Data

(60) Provisional application No. 61/452,905, filed on Mar. 15, 2011.

(51) Int. Cl.
*B01D 19/00* (2006.01)
*C02F 1/20* (2006.01)
*C02F 103/04* (2006.01)

(52) U.S. Cl.
CPC ......... *B01D 19/0005* (2013.01); *C02F 2209/38* (2013.01); *C02F 2209/40* (2013.01); *C02F 1/20* (2013.01); *B01D 19/0068* (2013.01); *B01D 19/0036* (2013.01); *B01D 19/0031* (2013.01); *C02F 2209/225* (2013.01); *C02F 2103/04* (2013.01); *B01D 19/0063* (2013.01); *C02F 2209/245* (2013.01)
USPC .......... 95/8; 95/263; 95/265; 95/246; 96/193; 96/202; 96/156

(58) Field of Classification Search
CPC ........... B01D 19/0005; B01D 19/0036; B01D 19/0068; C02F 1/20
USPC .......... 95/263, 265, 246, 8, 245; 96/193, 202, 96/156

See application file for complete search history.

(56) References Cited

U.S. PATENT DOCUMENTS

| 5,006,133 | A | * | 4/1991 | Mandrin et al. | 95/258 |
| 5,264,025 | A | * | 11/1993 | Asai et al. | 95/263 |
| 5,766,321 | A | * | 6/1998 | Ishihara et al. | 96/202 |
| 8,048,202 | B2 | * | 11/2011 | Agrawal | 95/159 |

FOREIGN PATENT DOCUMENTS

| DE | 3142459 A1 | 5/1983 |
| DE | 3143459 A1 | 5/1983 |
| EP | 0645168 A1 | 3/1995 |
| EP | 0646400 A1 * | 4/1995 |
| EP | 0646400 A1 | 4/1995 |
| JP | 2929690 B2 | 8/1999 |

* cited by examiner

*Primary Examiner* — Duane Smith
*Assistant Examiner* — Douglas Theisen
(74) *Attorney, Agent, or Firm* — Proskauer Rose LLP

(57) ABSTRACT

A system to purge dissolved gases selectively from liquids can include a first contactor having two first contactor inlets and two first contactor outlets. The first contactor can receive liquid from a liquid source at a first inlet of the first contactor and an inert gas source at a second inlet of the first contactor, the inert gas can purge a first portion of gas from the liquid source. The first portion of purged gas exits the first contactor at a first outlet of the first contactor. The second contactor can receive input from the second outlet of the first contactor and the inert gas, the inert gas purges a second portion of the gas from the liquid source. The second portion of purged gas can exit the second contactor at a first outlet of the second contactor.

122 Claims, 8 Drawing Sheets

SYSTEM TO REMOVE DISSOLVED GASES SELECTIVELY FROM LIQUIDS

CROSS REFERENCE TO RELATED APPLICATION

This application claims the benefit of and priority to U.S. Provisional Patent Application No. 61/452,905, filed Mar. 15, 2011, the entire disclosure of which is incorporated herein by reference.

FIELD OF THE INVENTION

In general, the invention relates to devices, systems and methods employed in wet cleaning semiconductor devices. In particular, the invention relates to a system that can purge unwanted gases from liquids.

BACKGROUND OF THE INVENTION

Microelectronics chips such as integrated circuits are made from comparatively large wafers of semiconductor material. This process typically involves multiple successive steps including the following: generation of an etch mask photolithographically; etching of a layer of material as defined by the mask; removal of the photolithographic mask through some combination of wet and dry chemical techniques; removal of oxide layers prior to further processing; deposition of layers of materials; and rinsing to remove residual chemistry. The photolithographic mask is formed from a polymeric material called a photoresist. After the photoresist mask has been removed, a final cleaning step, called rinsing or wet cleaning is typically performed.

Deionized Water (DI-water) (i.e., ultrapure water) is known for its use in this rinsing of semiconductor devices. It is known to prevent any metal corrosion and contamination of the devices. It is desirable for the DI-water to contain very low levels of dissolved gases (e.g., nitrogen, oxygen, and carbon dioxide). Degassing systems can be used to remove dissolved gases from DI-water.

Diluted hydrofluoric acid can be used to remove oxide layers from silicon surfaces. Oxygen in etching liquid may oxide further silicon, which can result in removal of more silicon dioxide than a desired amount. Degassing the hydrofluoric acid used in creating diluted hydrofluoric acid can minimize the removal of extra silicon dioxide.

Gases typically used in the semiconductor industry can have a high degree of purity with a low content of water. A liquid source to be degassed can have a high vapor pressure. DI-water or water in diluted HF can have a vapor pressure that is a function of temperature. The vapor pressure can be higher than the water content (partial pressure) in semiconductor grade gases. Water in contact with semiconductor grade gases can cause some or all of the water to evaporate. For example, for a HF concentration of <0.5% at 25 degrees Celsius, a relative vapor pressure for water can be much higher than the vapor pressure for the HF in the HF concentration. It is desirable for a degas system that can prevent the evaporation of water.

Current vacuum degas systems include membrane contactors and water-ring vacuum pumps. Water-ring vacuum pumps can require an additional water supply. Current membrane based vacuum degas systems have a limited lifetime, thus they can need to be replaced every few years.

Some current degas systems are located at the site where DI-water is generated. In these systems the DI-water can be transported the through piping to the location where the DI-water is used. The DI-water piping can increase the amount of oxygen concentration in the DI-water, thus compromise the low level of oxygen concentration necessary for many semiconductor applications. The diffusion of oxygen through the piping can also limit process stability, as the oxygen concentration in the DI-water depends on the overall residence time of the water in the piping.

SUMMARY OF THE INVENTION

In one aspect, the invention features a system to purge dissolved gases selectively from liquids. The system includes a first contactor including two first contactor inlets and two first contactor outlets. The first contactor is in fluid communication with a liquid source at a first inlet of the first contactor and an inert gas source at a second inlet of the first contactor. The second inlet of the first contactor receives inert gas that purges a first portion of gas from the liquid source. The first portion of purged gas exits the first contactor at a first outlet of the first contactor. The system also includes a second contactor including two second contactor inlets and two second contactor outlets. The second contactor is in fluid communication with a second outlet of the first contactor and the inert gas source at a second inlet of the second contactor. The second inlet of the second contactor receiving inert gas that purges a second portion of the gas from the liquid source. The second portion of purged gas exiting the second contactor at a first outlet of the second contactor.

In some embodiments, the system includes a liquid jet vacuum pump in fluid communication with the second contactor via a) a second outlet of the second contactor being in fluid communication with at least one inlet of the vacuum pump and b) an outlet of the vacuum pump being in fluid communication with the first inlet of the first contactor.

In some embodiments, the first contactor includes a plurality of first contactor inlets and a plurality of first contactor outlets. The liquid source and the inert gas in fluid communication with one or more of the plurality of first contactor inlets.

In some embodiments, the second contactor includes a plurality of second contactor inlets and a plurality of second contactor outlets. One or more of the plurality of second contactor inlets is in fluid communication with one or more of the plurality of first contactor outlets and the inert gas source.

In some embodiments, a liquid pump pressurizes fluid exiting the second outlet of the second contactor. In some embodiments, a portion of the pressurized fluid is used as a motivating liquid for the liquid jet vacuum pump. In some embodiments, a portion of the inert gas comprises an inert blanket gas. In some embodiments, the first portion of purged gas or the second portion of purged gas comprises an inert blanket gas.

In some embodiments, the system includes a housing that surrounds at least a portion of the first contactor and the second contactor, the housing is a material with low permeability. In some embodiments, the housing is purged with an inert gas. In some embodiments, the inert gas is the first portion of gas purged from the liquid source.

In some embodiments, the system includes a plurality of contactors each including two contactor inlets and two contactor outlets. The plurality of contactors are in fluid communication such that a first inlet of a third contactor of the plurality of contactors is in fluid communication with the second outlet of the second contactor, each first outlet of the plurality of contactors is in fluid communication with a first inlet of one of the plurality of contactors, and a second inlet of each of the plurality of contactors is in fluid communication with the inert gas source. The second inlet of each of the plurality of contactors receives inert gas that purges a portion of gas from the liquid source, each portion of purged gas exiting each of the plurality of contactors at a second outlet of each of the plurality of contactors.

In some embodiments, the system includes a liquid jet vacuum pump being in fluid communication with a last contactor of the plurality of contactors via a) a second outlet of the last contactor being in fluid communication with at least one inlet of the liquid jet vacuum pump, and b) an outlet of the liquid jet vacuum pump being in fluid communication with the first inlet of the first contactor.

In some embodiments, a vacuum level of the liquid jet vacuum pump is controlled by supplying additional inert gas to a second inlet of the last contactor. The inert gas purges an additional portion of the first gas. In some embodiments, the last contactor further comprises a third inlet, the third inlet being in fluid communication with an additional gas source such that fluid at the second outlet of the last contactor includes a desired concentration of the additional gas. In some embodiments, a vacuum level of the liquid jet vacuum pump is controlled by varying a water flow to the liquid jet vacuum pump, disabling the liquid jet vacuum pump, or enabling the liquid jet vacuum pump.

In some embodiments, the system includes further comprising one or more sensors to measure a concentration of gas at the first outlet of the second contactor outlet, the second outlet of the second contactor, or both the first outlet and the second outlet of the second contactor, the gas is substantially similar to the purged gas.

In some embodiments, the system includes a controller to control the concentration of gas at the second outlet of the second contactor based on the measured concentration by a) inputting the purged gas into the second contactor via the second inlet of the second contactor inlet, b) varying an amount of the inert gas supplied to the first contactor and the second contactor, or c) any combination thereof.

In some embodiments, the system includes a third contactor including two inlets and an outlet. The third contactor is in fluid communication with a second liquid source at the first inlet of the third contactor, the inert gas source at the second inlet of the third contactor, and the first contactor at the outlet of the third contactor. The first inlet of the third contactor receiving the second liquid source that humidifies the inert gas. The first contactor receives the humidified inert gas at the second inlet of the first contactor.

In some embodiments, the first contactor includes a third inlet. The third inlet is in fluid communication with a second liquid source. The third inlet receives a second liquid based on a concentration of the liquid source at the first inlet of the first contactor.

In another aspect, the invention features a method for purging dissolved gases selectively from liquids. The method involves supplying a liquid source and an inert gas to a first contactor to purge a first portion of a gas from the liquid source. The method also involves supplying the inert gas and an output of the first contactor to a second contactor to purge a second portion of the gas from the liquid source.

In some embodiments, the method involves supplying an output of the second contactor to a liquid jet vacuum pump to purge dissolved inert gas from a second contactor output and supplying an output of the liquid jet vacuum pump to the second contactor to purge a third portion of the gas from the liquid source.

In some embodiments, the method involves pressurizing fluid exiting the second contactor via a liquid pump.

In some embodiments, the method involves supplying a portion of the pressurized fluid to the liquid jet vacuum pump for use as a motivating liquid for the liquid jet vacuum pump.

In some embodiments, the method involves supplying a second gas to the inert gas to purge a third portion of the gas from the liquid source.

In some embodiments, the method involves controlling a vacuum level of the second contactor to purge a third portion of the gas from the liquid source.

In some embodiments, the method involves supplying the inert gas and an output of the second contactor to a third contactor of a plurality of contactors, supplying an output of each of the plurality of contactors to an input of one contactor of the plurality of contactors such that the first contactor, the second contactor and the plurality of contactors are connected, and supplying the inert gas to each of the plurality of contactors, the inert gas purging a portion of the gas from each of the plurality of contactors.

In some embodiments, the method involves supplying an output of a last contactor of the plurality of contactors to a liquid jet vacuum pump to purge an additional portion of the first gas from the liquid source.

In some embodiments, the method involves supplying additional inert gas to the last contactor to control a vacuum level of the liquid jet vacuum pump. In some embodiments, the method involves supplying an additional gas source to an input of the last contactor such that fluid at the output of the last contactor includes a desired concentration of the additional gas.

In some embodiments, the method involves controlling a vacuum level of the liquid jet vacuum pump by varying a water flow to the liquid jet vacuum pump, disabling the liquid jet vacuum pump, or enabling the liquid jet vacuum pump. In some embodiments, the method involves measuring a concentration of gas at the output of the second contactor. The gas is substantially similar to the purged gas.

In some embodiments, the method involves controlling the concentration of gas at the output of the second contactor based on the measured concentration by a) inputting the purged gas into the second contactor, b) varying an amount of the inert gas supplied to the first contactor and the second contactor, or c) any combination thereof.

In some embodiments, the method involves supplying a second liquid source and the inert gas to a third contactor to humidify the inert gas, and supplying the output of the third contactor to the first contactor such that the first contactor receives the humidified inert gas. In some embodiments, the method involves supplying a second liquid source to the first contactor based on a concentration of the liquid source at the first contactor.

Some advantages of the invention are a higher lifetime and a low effort for maintenance or no effort for maintenance (e.g., maintenance free), as compared to conventional systems. For example, current systems can require that membrane contactors be exchanged up to every two years. Further advantages of the invention include a low consumption of inert gas, lower cost and a small size. For example, reduction of inert gas consumption by a factor of 5 can be achieved.

Even further advantages are that inert gases that exit the first contactor can be used as a nitrogen blanket for the degassing system, thus reducing back diffusion of oxygen through the contactor walls or the piping into the liquid. Even further advantages are that evaporation of the liquid source can be avoided.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In general overview, a system to purge gases selectively from liquids can include two or more contactors. Each contactor purges a portion of the gas. The system can include a boost pump in order to boost the pressure of the outlet liquid of the last contactor. The system can also include a liquid jet vacuum pump, which can use a part of the pressurized outlet liquid as a motivating fluid. In a two contactor system, with a liquid jet vacuum pump, the first contactor runs at a higher pressure than the second contactor, and the liquid jet vacuum pump can recycle gas and liquid from the second contactor back into the first contactor, thus behaving as a vacuum source.

Figure 1:
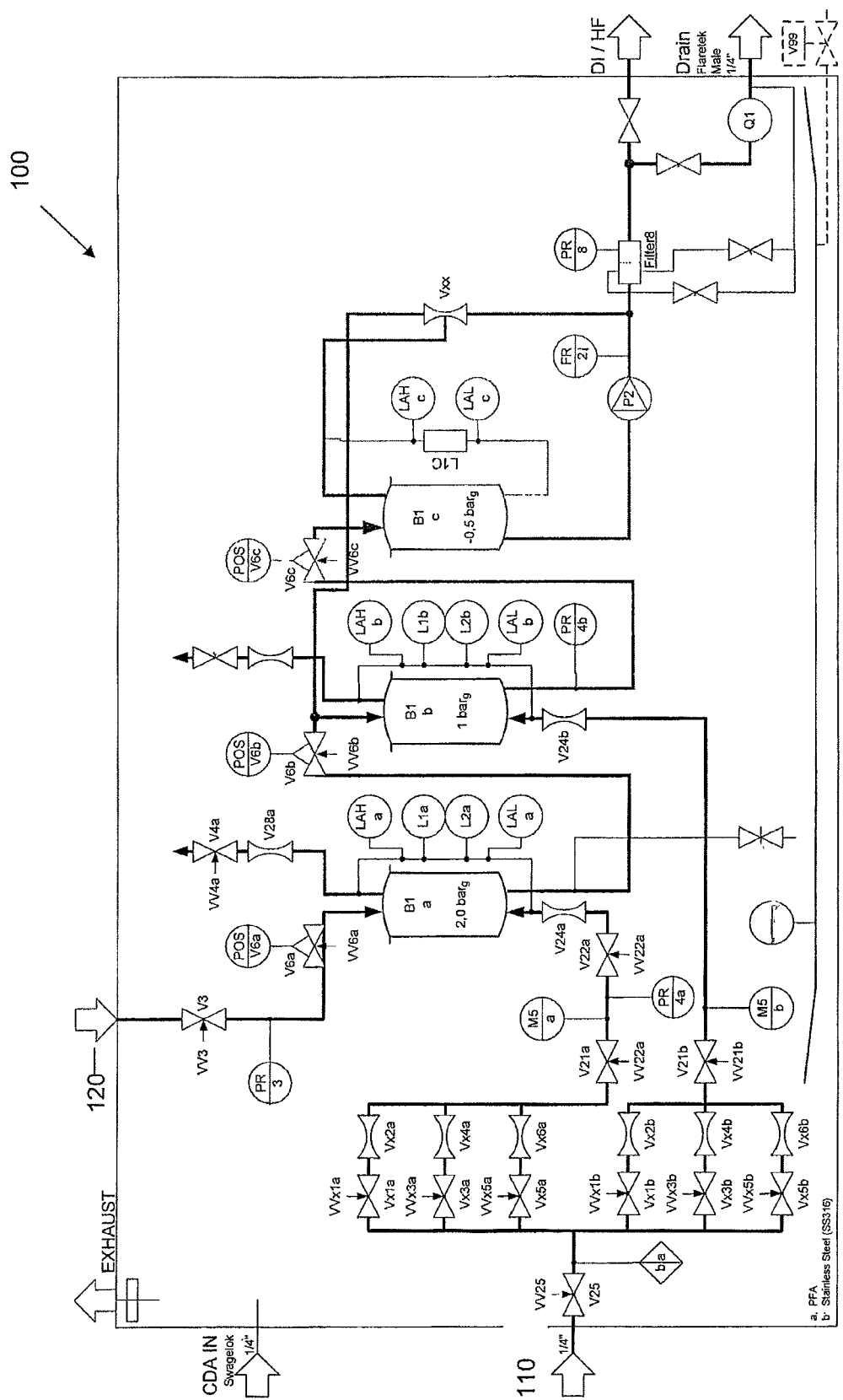
FIG. 1 is a block diagram of an exemplary embodiment of a system to purge gases selectively from liquids.

FIG. 1 is a block diagram of an exemplary embodiment of a system 100 to purge gases selectively from liquids. The system 100 has two contactors B1a and B1b to purge unwanted gas. A liquid inlet 120 (i.e., a liquid source) is in fluid communication with a first contactor B1a via controlled valves V3 and V6a to supply a liquid to the first contactor B1a. An inert gas inlet 110 (i.e. a gas source) is in fluid communication with the first contactor B1a via controlled gas valves Vx1a-Vx6a, V21a, V22a and V24a to supply an inert gas to the first contactor B1a. Supplying the liquid and the inert gas to the first contactor B1a results in the inert purge gas coming in direct contact with the liquid. Due to the differential partial pressure of unwanted gas in the liquid, a first portion of the unwanted gas transits into a purge gas and is released via and outlet in fluid communication with V28a and V4a.

In various embodiments, the liquid is deionized water (DI-water), Hydrogen Fluoride (HF), a mixture of DI-Water and HF, acids, bases, and/or solvents. In various embodiments, the inert gas is nitrogen ($N_2$), Hydrogen (H), Argon (Ar), and/or a noble gas. In various embodiments, the unwanted gas is Oxygen (O) and/or Carbon Dioxide ($CO_2$).

The first contactor B1a is in fluid communication with a second contactor B1b via variable gas valve V6b to supply the liquid with the first portion of unwanted gas purged to the second contactor B1b. The inert gas inlet 110 can be in fluid communication with the second contactor B1b via variable gas valves Vx1b-Vx6b, V21b and V24b to supply the inert gas to the second contactor B1b. Supplying the liquid from the first contactor B1a and the inert gas to the second contactor B1b results in a second portion of the unwanted gas in the liquid to be purged.

In some embodiments, the second contactor B1b is in fluid communication with a third contactor B1c via variable valve V6c to supply the liquid with the first and second portions of unwanted gas purged. Supplying the liquid from the second contactor B1b to the third contactor B1c results in a third portion of the unwanted gas in the liquid to be purged. In some embodiments, any number of contactors is serially connected. Each additional contactor that is serially connected can purge an additional portion of the unwanted gas in the liquid to be purged, such that a desired amount of unwanted gas is purged.

In some embodiments, a pump P2 is in fluid communication with the last contactor that the liquid to be purged passes through. The second to last contactor can operate at a lower pressure than the first contactor. The pump P2 draws liquid out of the last contactor and feeds a part of the liquid into a jet vacuum pump Vxx. The jet vacuum pump Vxx draws gas out of the last contactor. The drawn out gas together with fluid needed for operation of the jet vacuum pump Vxx is input into the second to last contactor, allowing the jet vacuum pump Vxx to behave as a vacuum source. The embodiment shown in FIG. 1 has a liquid jet vacuum pump Vxx. When purging with an inert gas under pressure, a portion of the inert gas dissolves in the liquid. The liquid jet vacuum pump Vxx can reduce the saturation of the inert gas in the liquid and prevents bubbles in the liquid. The pump P2 can supply the outlet liquid at the necessary pressure for usage in a processing tool.

In embodiments including the second contactor B1b, the second contactor B1b can be fluid communication with the liquid jet vacuum pump Vxx. In embodiments including the third contactor B1c, the third contactor B1c can be fluid communication with a liquid jet vacuum pump Vxx. The liquid jet vacuum pump Vxx draws gas out of the last contactor and feeds the drawn out gas together with the fluid needed for operation of the pump into other contactors. For example, in the embodiment having the third contactor B1c, gas and liquid drawn out of third contactor B1c is recycled to the second contactor B1b. Recycling the gas drawn out of the third contactor B1c allows the second contactor B1b and the third contactor B1c to purge even more unwanted gas from the liquid. A liquid jet vacuum pump is advantageous over other vacuum pumps because no gases leak out of the vacuum pump which is driven by liquid. Another advantage of the liquid jet vacuum pump is it is easy to maintain compared to other vacuum pumps can be completely maintenance free. The liquid jet vacuum shown in FIG. 1 can be implemented within the system without the use of an additional water source. In some embodiments, a vacuum level of the liquid jet vacuum pump can be controlled. The vacuum level of the liquid jet vacuum pump can be controlled by varying a water flow to the liquid jet vacuum pump, disabling the liquid jet vacuum pump, and/or enabling the liquid jet vacuum pump. Varying the vacuum level of the liquid jet vacuum pump can increase a mass transfer from the liquid source to the inert gas, reduce the risk of cavitation in the pump and/or assist the vacuum pump in operating within the pump power limitations. In some embodiments, the third contactor B1c is in direct communication with the inert gas inlet 110.

The first contactor B1a, the second contactor B1b, and the third contactor B1c can be packed tower columns. One advantage of packed tower columns is that both liquids and gases can be input to the contactor and can be in direct contact. Another advantage of packed tower columns is that diluted HF or concentrated HF can be used. In some embodiments, the wall of the packed tower column includes material that has at least one of a low diffusion coefficient or a special coating. One advantage of multiple contactors is that less inert gas can be used. In some embodiments, the inert gas required can be reduced by a factor of 5. In some embodiments, the contactors are surrounded by a housing and the outlet gas from the contactors serve as an inert blanket gas. In some embodiments, the housing has a material having a low permeability. For example, the housing material can be fire retardant PVC, PVC-C with permeability coefficient of 4.5 E-12 $cm^3*cm/(cm^2*s*cm\ HG)$, or PVDF with 4E-12 $cm^3*cm/(cm^2*s*cm\ HG)$. In some embodiments, the housing is coated with Polyvinylidene chloride with a permeability coefficient of ca. 5E-13 $cm^3*cm/(cm^2*s*cm\ HG)$. In some embodiments, the housing is coated with coated with a metalized foil.

In some embodiments, the housing is purged. The housing can be purged with gas that is purged from the contactors. Purging the housing with gas can partially or fully eliminate unwanted vapor (e.g., HF-vapor) that can be introduced inside the housing. For example, when the system is degassing DI-water, the offgas from a contactor that is operated with a pressure above ambient pressure is dried due to the expansion to ambient pressure. The offgas from the contactor typically has less oxygen then ambient air. The offgas can be used as a shielding/cover gas to protect the contactors against oxygen permeation into the contactor from the ambient air. Using the offgas as a shielding gas against permeation from the outside can be advantageous because it can decrease the cost of ownership and/or increase performance without adding additional gas into the system (e.g., the offgas is a result of the inert gas that is used to run the system).

In some embodiments, additional inert gas is used as an inert blanket gas. The inert blanket gas is advantageous because it surrounds the contactors with a gas of low content of the unwanted species, thus minimizing back diffusion of the unwanted gas species into the degasified liquid, contactor walls or into the piping of the liquid.

The system 100 includes a plurality of sensors such as M5$a$, M5$b$, PR3, PR4$a$, PR8, FR21 and Q1. The sensors can be used to monitor and/or control parameters such as flow rate or pressure of the gases and liquids or type of fluids passing through the system. The sensor Q1 can monitor the unwanted dissolved gas in the outlet. The system 100 includes level sensors LAH, LAL, L1$a$, L2$a$, L1$b$, L2$b$, and L1$c$, to monitor and/or control the liquid levels in the contactors. In some embodiments, a controller (not shown) controls the pressure of the pump P2, the flow of inert gas, the flow of liquid into and between contactors, and the vacuum pump based on measurements taken by one or more of the plurality of sensors. In some embodiments, the controller communicates with the variable valves Vx1$a$-Vx6$a$, V21$a$, V22$a$ and V24$a$, Vx1$b$-Vx6$b$, V21$b$, and V24$b$ to adjust the flow rate of inert gas. In some embodiments, the controller communicates with the variable valves V6$a$, V6$b$, and V6$c$ to adjust the flow of liquid into the first contactor B1$a$ and between the first contactor B1$a$, the second contactor B1$b$ and the third contactor B1$c$. In some embodiments, the liquid level in the first contactor B1$a$, the second contactor B1$b$ and the third contactor B1$c$ is constant.

In some embodiments, the first contactor B1$a$ has a by-pass unit that includes sensors LAH$a$, L1$a$, L2$a$, and LAL$a$ that control and/or monitor liquid levels. The sensors can be in communication with a controller or a control module to allow for automatic control. In some embodiments, the second contactor B1$b$ has a by-pass unit that includes sensors LAH$b$, L1$b$, L2$ba$, and LAL$b$. In some embodiments, the third contactor has level sensors L1$c$, LAH$c$, and LAL$c$.

In some embodiments, the inert gas is used to enrich the liquid with the inert gas. In some embodiments, multiple gas inlets are used. In some embodiments, the inert gas is used to purge more than one unwanted gas. For example, carbon dioxide may diffuse through plastic in piping that can be used for distribution of DI-water. In another example, in order to rinse a wafer with aluminum metallization, it is desirable to remove both oxygen and carbon dioxide.

In some embodiments, a third gas is mixed with the inert gas in order to achieve a desired concentration of the third gas in the liquid at the outlet of the system. In some embodiments, a third gas is selectively directed to a subset of all the contactors in the system. In some embodiments, an additional contactor is in liquid communication at the outlet of the system to enrich the output liquid with a third gas.

In some embodiments, a vacuum level of one or more contactors is controlled such that an amount of inert gas or third gas in the output liquid is controlled. Controlling the amount of inert gas or third gas in the output liquid can control the liquid contents for special purposes.

Figure 2A:
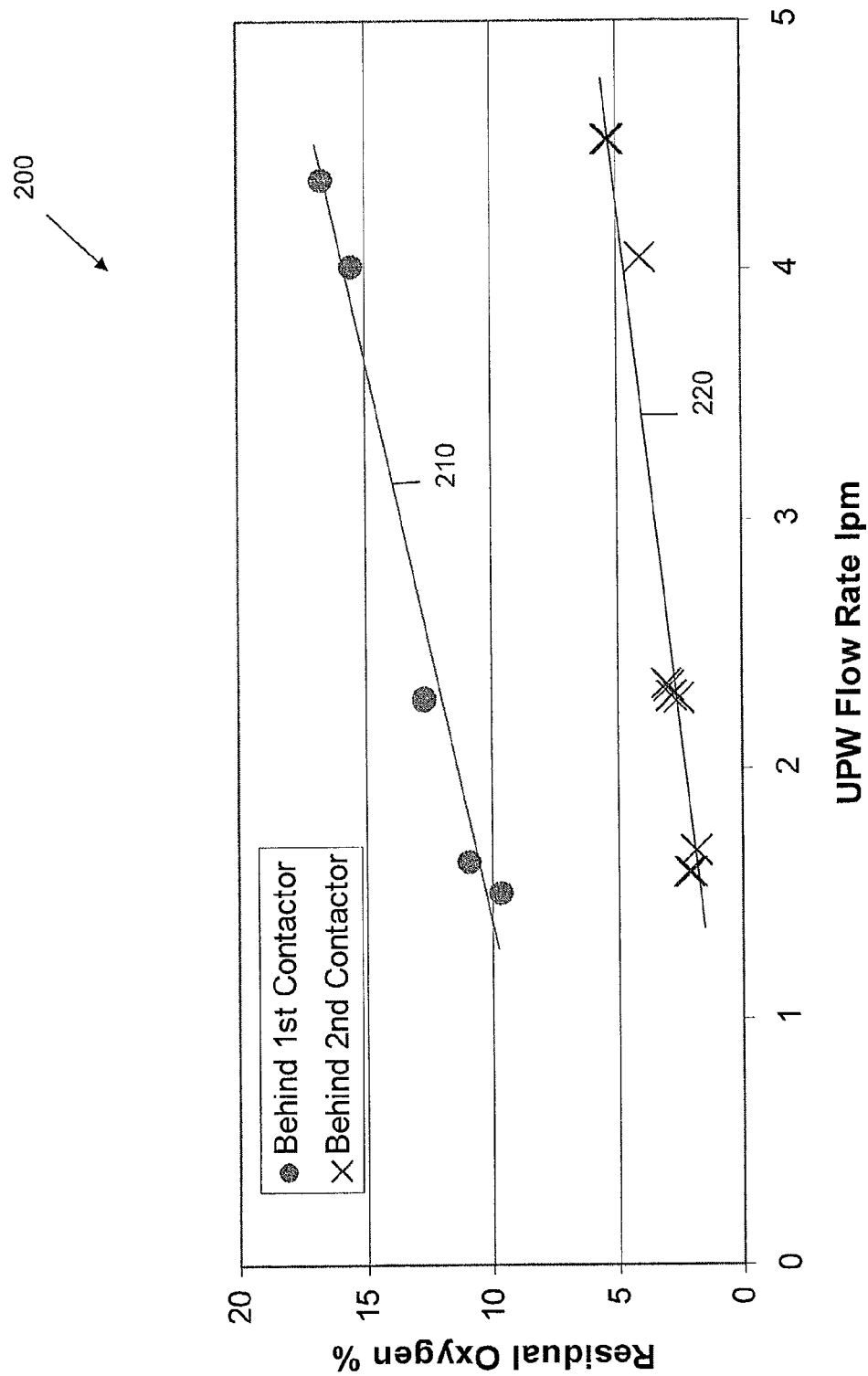
FIG. 2A is a graph showing the percentage of gas in DI-water versus DI-flow.

FIG. 2A is a graph 200 showing the percentage of gas (e.g., Oxygen) in DI-water as a function of the DI-water (Ultrapure Water UPW) flow rate. Plot line 210 shows the percentage of Oxygen in the DI-water after exiting a first contactor (e.g., first contactor B1$a$ as described above in FIG. 1). Plot line 220 shows the percentage of Oxygen in the DI-water after exiting a second contactor (e.g., second contactor B1$b$ as described above in FIG. 2).

Figure 2B:
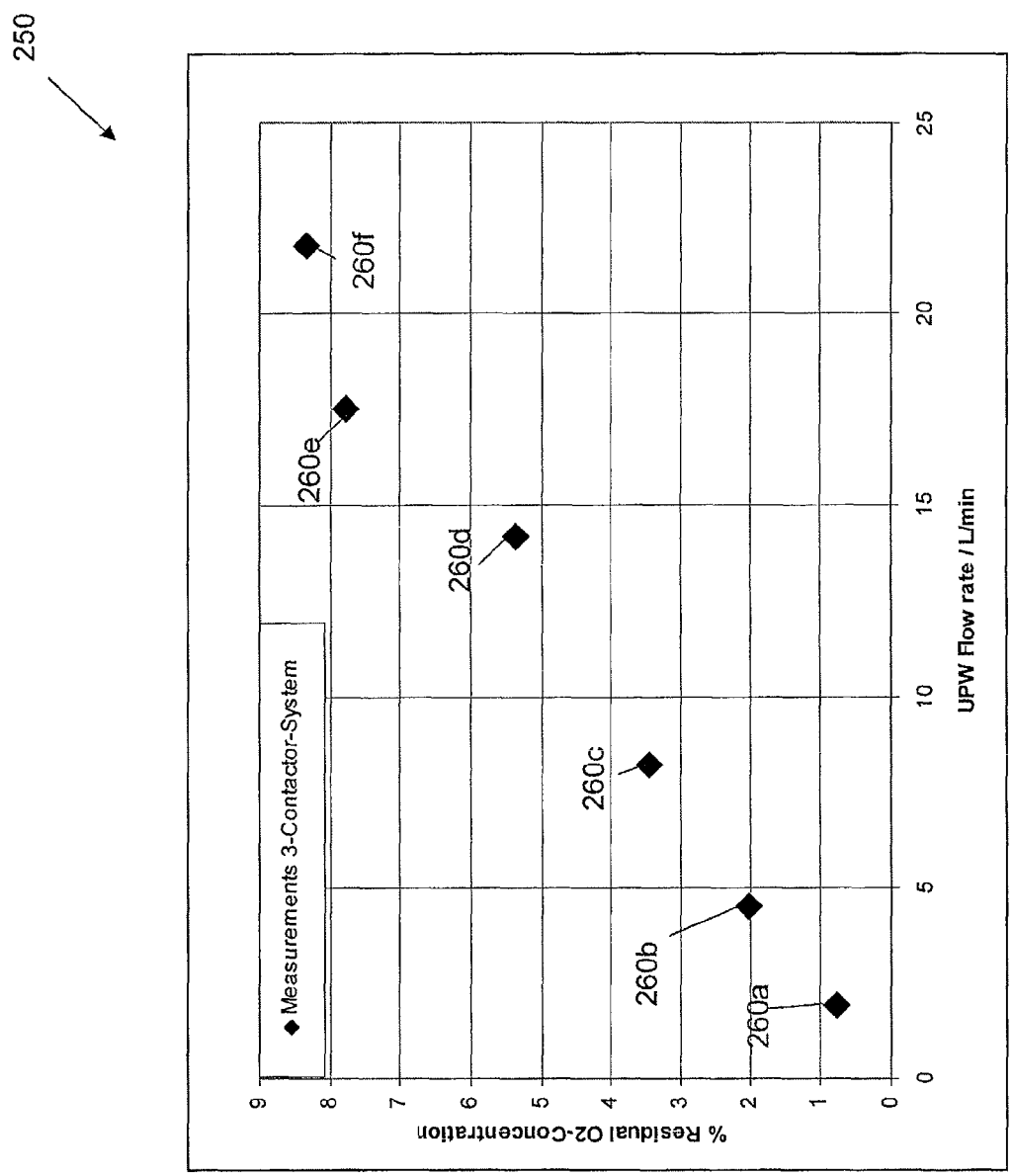
FIG. 2B is a graph showing the percentage of gas in DI-water versus DI-flow for a three contactor system.

FIG. 2B is a graph 250 showing the percentage of gas (e.g., Oxygen) in DI-water as a function of the DI-water (Ultrapure Water UPW) flow rate for a three contactor system. Plot points 260$a$, 260$b$, 260$c$, 260$d$, 260$e$ and 260$f$ shows the percentage of Oxygen in the DI-water after exiting a third contactor.

Figure 3:
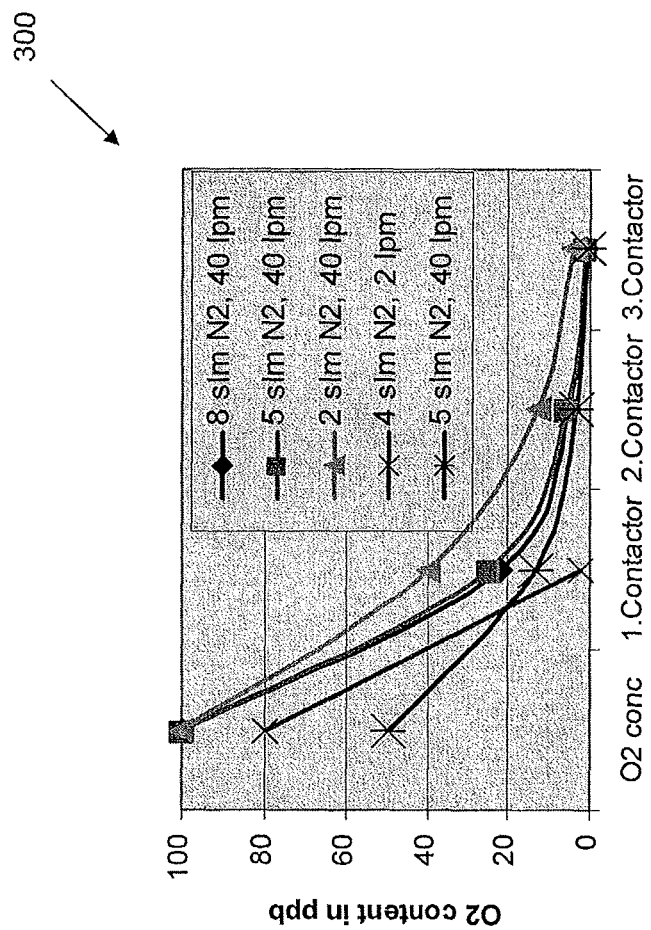
FIG. 3 is a graph showing the percentage of gas in DI-water versus number of contactors.

FIG. 3 is a graph 300 showing the percentage of gas (e.g., Oxygen) in DI-water with varying concentrations of injected inert gas (e.g., Nitrogen) as a function of the number of contactors the liquid flows through. For example, for Nitrogen of 2 slm B2, 40 lpm, the Oxygen concentration is 100 ppb before passing through any contactor. The Oxygen concentration is approximately 40 ppb after passing through a first contactor. The Oxygen concentration is approximately 10 ppb after passing through a second contactor. The Oxygen concentration is approximately 2 ppb after passing through a third contactor.

Figure 4:
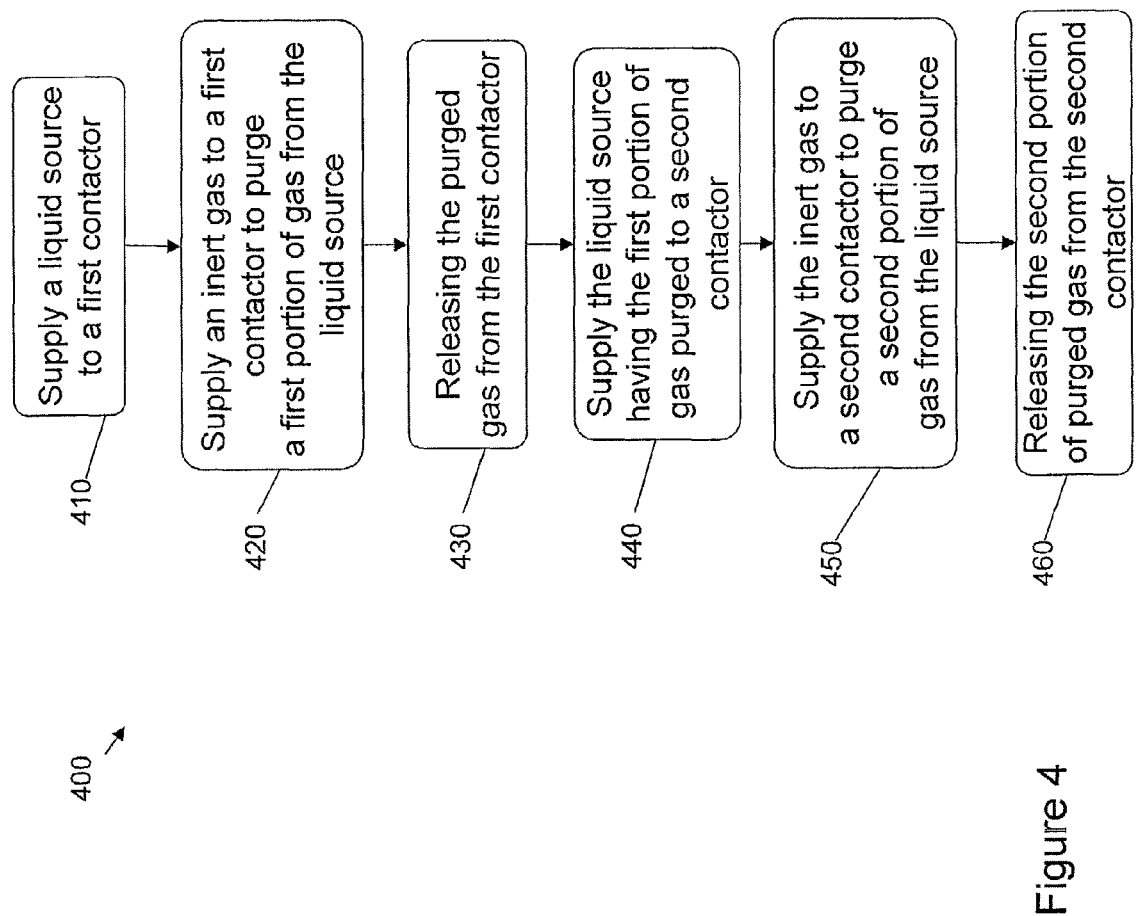
FIG. 4 is a flow chart for a method for purging dissolved gases selectively from liquids, according to an illustrative embodiment of the invention.

FIG. 4 is a flow chart 400 for a method for purging dissolved gases selectively from liquids, according to an illustrative embodiment of the invention. The methods can be carried out, for example, via the system shown above in FIG. 1. The method involves supplying a liquid source to a first contactor (Step 410). For example, the first contactor B1 as described above in connection with FIG. 1. The method also involves supplying an inert gas to the first contactor (Step 420). The inert gas purges a first portion of a first gas from the liquid source. The method also involves releasing the first portion of the first gas from the liquid source (Step 430).

The method also involves supplying the liquid source having the first portion of purged gas from the first contactor to the second contactor (Step 440). For example, the second contactor B2 as described above in FIG. 1. The method also involves supplying the inert gas to the second contactor (Step 450). The inert gas purges a second portion of the first gas from the liquid source. The method also involves releasing the second portion of the purged gas from the second contactor (Step 460).

In some embodiments, the method includes supplying the liquid source with the first and second portion of gases purged from the second contactor to a vacuum pump (e.g., a liquid jet vacuum pump). The vacuum pump can dissolve inert gas from the liquid source. In some embodiments, an output of the vacuum pump is input to the second contactor, purging a third portion of the first gas from the liquid source.

During operation of the system, contact between the inert gas and the liquid source can cause a portion of the liquid source to evaporate. For example, when the liquid source is HF diluted with water, the water can evaporate at a rate that is faster than the HF evaporates, causing the HF-concentration in the HF diluted with water to rise. As the HF diluted water promulgates through two or more contactors, the water can evaporate further upon entry of each successive contactor. The HF-concentration can rise even further.

Figure 5A:
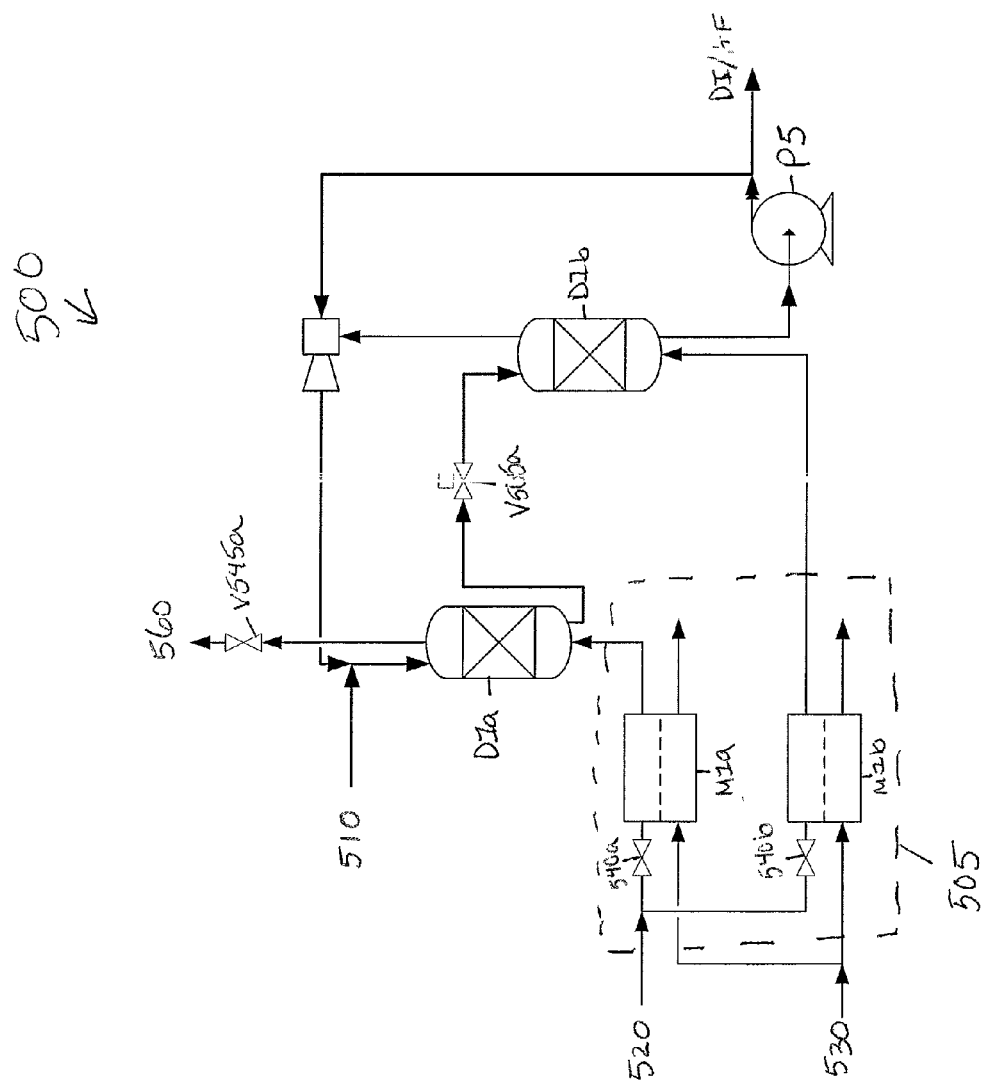
FIG. 5A is a block diagram of an exemplary embodiment of a system to purge gases selectively from liquids.

FIG. 5A is a block diagram of an exemplary embodiment of a system 500 to purge gases selectively from liquids. The system 500 has two contactors D1a and D1b to purge unwanted gas and a humidification stage 505 to humidify inert gas input to the two contactors D1a and D1b. A first liquid inlet D1a 510 (i.e., a first liquid source) is in fluid communication with a first contactor D1a via controlled valves (not shown) to supply a first liquid to the first contactor D1a.

The humidification stage includes a first membrane contactor M1a and a second membrane contactor M1b. An inert gas inlet 520 (i.e. an inert gas source) and a second liquid inlet 530 (i.e. a second liquid source) are in fluid communication with a first membrane contactor M1a via controlled valves V540a and a second membrane contactor M1b via controlled valves V540b to supply the inert gas source and the second liquid source to the first membrane contactor M1a and the second membrane contactor M1b. Supplying the inert gas and the second liquid to the first membrane contactor M1a and the second membrane contactor M1b results in the inert gas source coming in direct contact with the second liquid source. The second liquid humidifies the inert gas.

The first membrane contactor M1a is in fluid communication with the first contactor D1a via control valves (not shown) to supply a first humidified inert gas to the first contactor D1a. Humidifying the inert gas source can minimize an unwanted concentration change of the first liquid due to vaporization that can be caused by the first liquid when it is in contact with the inert gas. Supplying the first liquid and the humidified inert gas to the first contactor D1a results in the humidified inert gas coming in direct contact with the liquid. Due to the differential partial pressure of unwanted gas in the first liquid, a first portion of the unwanted gas transits into a purge gas and is released via an outlet 560 in fluid communication with controlled valve V545a.

The first contactor D1a is in fluid communication with a second contactor D1b via variable gas valve V565a to supply the first liquid with the first portion of unwanted gas purged to the second contactor D1b. The second membrane contactor M1b is in fluid communication with the second contactor D1b via control valves (not shown) to supply a second humidified inert gas to the second contactor D1b. Supplying the liquid from the first contactor D1a and the second humidified inert gas to the second contactor D1b results in a second portion of the unwanted gas in the first liquid to be purged. Pump P5 is in fluid communication with the second contactor D1b.

In some embodiments, any number of contactors is serially connected. Each additional contactor that is serially connected can purge an additional portion of the unwanted gas in the liquid to be purged. In some embodiments, each serially connected contactor is in fluid communication with a membrane contactor, each membrane contactor in fluid communication with the inert gas and the second liquid, such that each serially connected contactor receives a humidified inert gas source.

Figure 5B:
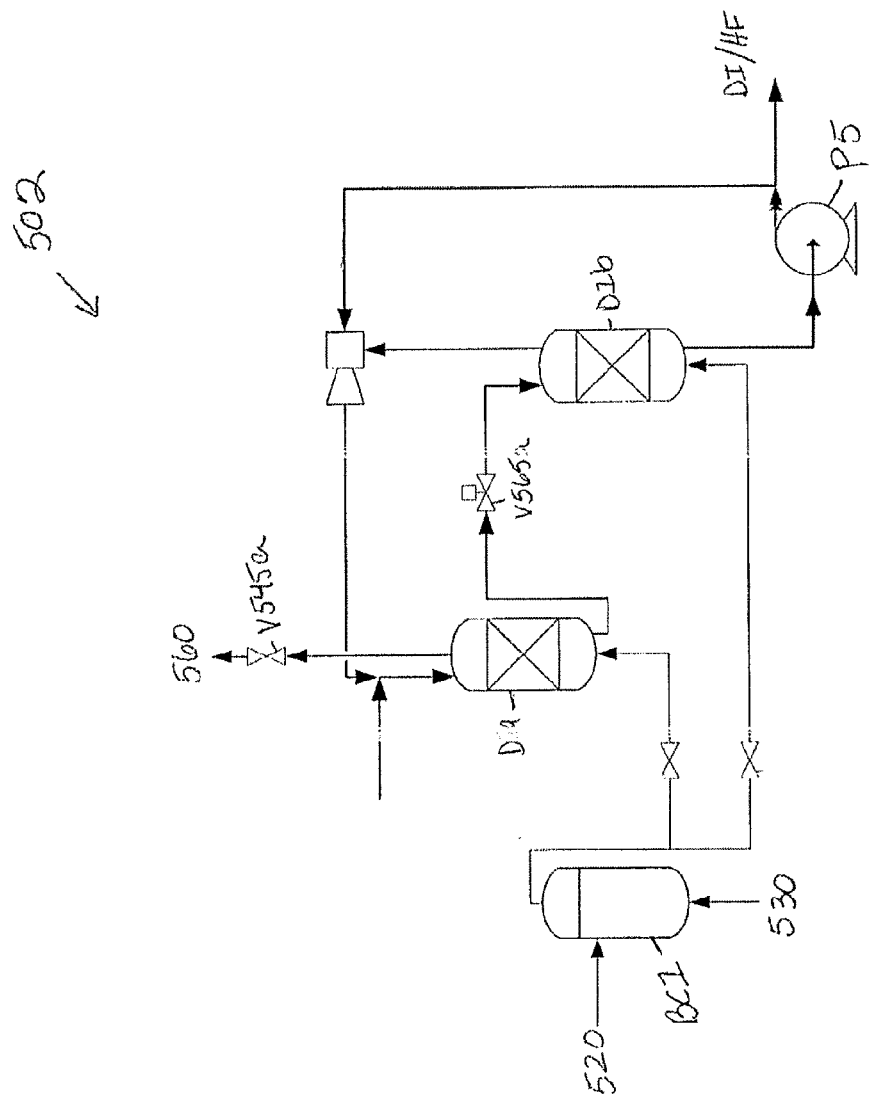
FIG. 5B is a block diagram of an exemplary embodiment of a system to purge gases selectively from liquids.

In some embodiments, the humidification stage is a bubble column as shown in FIG. 5B. The inert gas inlet 520 and the second liquid inlet 530 are in fluid communication with a bubble column BC1 via controlled valves to supply the inert gas source and the second liquid source to the bubble column BC1. Supplying the inert gas and the second liquid to the bubble column BC1 results in the inert gas source coming in direct contact with the second liquid source. The second liquid humidifies the inert gas.

In some embodiments, the second liquid source has the same composition and temperature as the first liquid source. In some embodiments, the second liquid source has substantially the same composition and temperature as the first liquid source. In some embodiments, the inert gas has the same vapor load at the inlet and the outlet of each contactor such that no liquid is lost. In some embodiments, the inert gas has substantially the same vapor load at the inlet and the outlet of each contactor such that substantially no liquid is lost.

In some embodiments, the second liquid source can be water. For example, for a liquid source of HF diluted water, water can be added to one or more of the contactors. In some embodiments, the amount of the second liquid source supplied to the humidification stage is based on a measured concentration of the liquid source The concentration of the liquid source can be measured at the inlet of a contactor and/or at the outlet of a contactor. For example, the liquid source can be measured at the inlets of contactors B1, B2 and/or B3 as described above in FIG. 1 or contactors D1a and D1b as described above in FIG. 5A and FIG. 5B. The liquid source can be measured at any part of the system.

Figure 7:
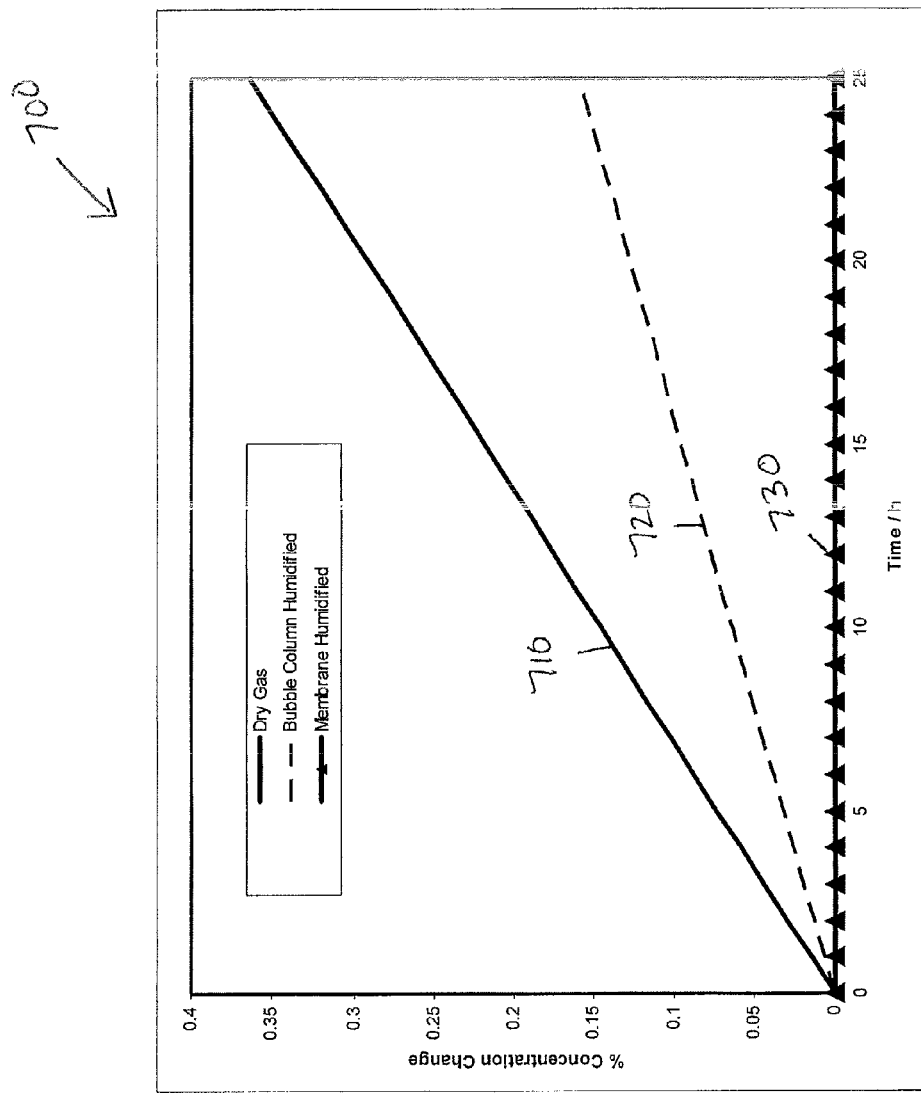
FIG. 7 is a graph showing a change in concentration of a first liquid source over time for dry and humidified inert gas sources.

FIG. 7 is a graph 700 showing a percent change in concentration of the first liquid source over time for dry and humidified inert gas sources. For an inert gas that is not humidified (i.e., dry gas) 710 the percent change of concentration is greater than for gas that has been humidified by a bubble column 720, or membrane contactor(s), 730. For an inert gas that has been humidified by membrane contactor(s) the percent change of the concentration of the liquid source can be approximately zero.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A system to purge dissolved gases selectively from liquids, comprising:
 a first contactor including two first contactor inlets and two first contactor outlets, the first contactor being in fluid communication with a liquid source at a first inlet of the first contactor and an inert gas source at a second inlet of the first contactor, the second inlet of the first contactor receiving inert gas that purges a first portion of gas from the liquid source, the first portion of purged gas exiting the first contactor at a first outlet of the first contactor; and
 a second contactor including two second contactor inlets and two second contactor outlets, the second contactor being in fluid communication with a second outlet of the first contactor and the inert gas source at a second inlet of the second contactor, the second inlet of the second contactor receiving inert gas that purges a second portion of the gas from the liquid source, the second portion of purged gas exiting the second contactor at a first outlet of the second contactor; and a liquid jet vacuum pump being in fluid communication with the second contactor via a) a second outlet of the second contactor being in fluid communication with at least one inlet of the vacuum pump and b) an outlet of the vacuum pump being in fluid communication with the first inlet of the first contactor.

2. The system of claim 1 wherein the first contactor includes a plurality of first contactor inlets and a plurality of first contactor outlets, the liquid source and the inert gas being in fluid communication with one or more of the plurality of first contactor inlets.

3. The system of claim 1 where the second contactor includes a plurality of second contactor inlets and a plurality of second contactor outlets, one or more of the plurality of second contactor inlets being in fluid communication with one or more of the plurality of first contactor outlets and the inert gas source.

4. The system of claim 1, further comprising a liquid pump being in fluid communication with the second contactor via the second outlet of the second contactor to pressurize fluid exiting the outlet of the second contactor.

5. The system of claim 4, wherein the liquid pump is in fluid communication with the liquid jet vacuum pump to provide a portion of the pressurized fluid to be used as a motivating liquid for the liquid jet vacuum pump.

6. The system of claim 1 wherein the inert gas source is in fluid communication with the first contactor and the second contactor such that a portion of the inert gas provides an inert blanket gas to the first contactor and the second contactor.

7. The system of claim 1 wherein the first portion of purged gas or the second portion of purged gas is in fluid communication with the first contactor and the second contactor to provide an inert blanket gas to the first contactor and the second contactor.

8. The system of claim 1 further comprising:

a plurality of contactors each including two contactor inlets and two contactor outlets, the plurality of contactors being in fluid communication such that a first inlet of a third contactor of the plurality of contactors is in fluid communication with the second outlet of the second contactor, each first outlet of the plurality of contactors is in fluid communication with a first inlet of one of the plurality of contactors and a second inlet of each of the plurality of contactors is in fluid communication with the inert gas source, the second inlet of each of the plurality of contactors receiving inert gas that purges a portion of gas from the liquid source, each portion of purged gas exiting each of the plurality of contactors at a second outlet of each of the plurality of contactors.

9. The system of claim 8 further comprising a liquid jet vacuum pump being in fluid communication with a last contactor of the plurality of contactors via:

a) a second outlet of the last contactor being in fluid communication with at least one inlet of the liquid jet vacuum pump, and b) an outlet of the liquid jet vacuum pump being in fluid communication with the first inlet of the first contactor.

10. The system of claim 9 wherein the second inlet of the last contactor is in fluid communication with the inert gas source such that a vacuum level of the liquid jet vacuum pump is controlled and the inert gas purges an additional portion of the first gas.

11. The system of claim 1 further comprising one or more sensors to measure a concentration of gas at the first outlet of the second contactor, the second outlet of the second contactor, or both the first outlet and the second outlet of the second contactor, the gas is substantially similar to the purged gas.

12. The system of claim 11 further comprising a controller to control the concentration of gas at the second outlet of the second contactor based on the measured concentration by:

a) inputting the purged gas into the second contactor via the second inlet of the second contactor inlet, b) varying an amount of the inert gas supplied to the first contactor and the second contactor, or c) any combination thereof.

13. The system of claim 1 further comprising a housing that surrounds at least a portion of the first contactor and the second contactor, wherein the housing is a material with low permeability.

14. The system of claim 13 wherein inert gas source is in fluid communication with the housing to purge the housing with the inert gas.

15. The system of claim 14 wherein the first portion of gas purged from the liquid source is in fluid communication with the housing to purge the housing with the first portion of gas purged.

16. The system of claim 1 wherein the first contactor further comprises a third inlet, the third inlet being in fluid communication with a second liquid source, the third inlet receiving a second liquid based on a concentration of the liquid source at the first inlet of the first contactor.

17. A system to purge dissolved gases selectively from liquids, comprising:

a first contactor including two first contactor inlets and two first contactor outlets, the first contactor being in fluid communication with a liquid source at a first inlet of the first contactor and an inert gas source at a second inlet of the first contactor, the second inlet of the first contactor receiving inert gas that purges a first portion of gas from the liquid source, the first portion of purged gas exiting the first contactor at a first outlet of the first contactor; and a second contactor including two second contactor inlets and two second contactor outlets, the second contactor being in fluid communication with a second outlet of the first contactor and the inert gas source at a second inlet of the second contactor, the second inlet of the second contactor receiving inert gas that purges a second portion of the gas from the liquid source, the second portion of purged gas exiting the second contactor at a first outlet of the second contactor; and a housing that surrounds at least a portion of the first contactor and the second contactor, wherein the housing is a material with low permeability.

18. The system of claim 17 wherein the inert gas source is in fluid communication with the housing to purge the housing with the inert gas.

19. The system of claim 18 wherein the first portion of gas purged from the liquid source is in fluid communication with the housing to purge the housing with the first portion of gas purged.

20. The system of claim 17 wherein the first contactor includes a plurality of first contactor inlets and a plurality of first contactor outlets, the liquid source and the inert gas being in fluid communication with one or more of the plurality of first contactor inlets.

21. The system of claim 17 where the second contactor includes a plurality of second contactor inlets and a plurality of second contactor outlets, one or more of the plurality of second contactor inlets being in fluid communication with one or more of the plurality of first contactor outlets and the inert gas source.

22. The system of claim 17, further comprising a liquid pump being in fluid communication with the second contactor via a second outlet of the second contactor to pressurize fluid exiting the outlet of the second contactor.

23. The system of claim 17, further comprising a liquid jet vacuum pump being in fluid communication with the second contactor via a) a second outlet of the second contactor being in fluid communication with at least one inlet of the vacuum pump and b) an outlet of the vacuum pump being in fluid communication with the first inlet of the first contactor, wherein the liquid pump is in fluid communication with the liquid jet vacuum pump to provide a portion of the pressurized fluid to be used as a motivating liquid for the liquid jet vacuum pump.

24. The system of claim 17 wherein the inert gas source is in fluid communication with the first contactor and the second contactor such that a portion of the inert gas provides an inert blanket gas to the first contactor and the second contactor.

25. The system of claim 17 wherein the first portion of purged gas or the second portion of purged gas is in fluid communication with the first contactor and the second contactor to provide an inert blanket gas to the first contactor and the second contactor.

26. The system of claim 17 further comprising:
a plurality of contactors each including two contactor inlets and two contactor outlets, the plurality of contactors being in fluid communication such that a first inlet of a third contactor of the plurality of contactors is in fluid communication with the second outlet of the second contactor,
each first outlet of the plurality of contactors is in fluid communication with a first inlet of one of the plurality of contactors and a second inlet of each of the plurality of contactors is in fluid communication with the inert gas source, the second inlet of each of the plurality of contactors receiving inert gas that purges a portion of gas from the liquid source, each portion of purged gas exiting each of the plurality of contactors at a second outlet of each of the plurality of contactors.

27. The system of claim 26 further comprising a liquid jet vacuum pump being in fluid communication with a last contactor of the plurality of contactors via:
a) a second outlet of the last contactor being in fluid communication with at least one inlet of the liquid jet vacuum pump, and
b) an outlet of the liquid jet vacuum pump being in fluid communication with the first inlet of the first contactor.

28. The system of claim 27 wherein a vacuum level of the liquid jet vacuum pump is controlled by supplying additional inert gas to a second inlet of the last contactor, the inert gas purges an additional portion of the first gas.

29. The system of claim 26 wherein the last contactor further comprises a third inlet, the third inlet being in fluid communication with an additional gas source such that fluid at the second outlet of the last contactor includes a desired concentration of the additional gas.

30. The system of claim 17 further comprising one or more sensors to measure a concentration of gas at the first outlet of the second contactor, the second outlet of the second contactor, or both the first outlet and the second outlet of the second contactor, the gas is substantially similar to the purged gas.

31. The system of claim 30 further comprising a controller to control the concentration of gas at the second outlet of the second contactor based on the measured concentration by:

a) inputting the purged gas into the second contactor via the second inlet of the second contactor inlet,
b) varying an amount of the inert gas supplied to the first contactor and the second contactor, or
c) any combination thereof.

32. The system of claim 17 further comprising a third contactor including two inlets and an outlet, the third contactor being in fluid communication with a second liquid source at the first inlet of the third contactor, the inert gas source at the second inlet of the third contactor, and the first contactor at the outlet of the third contactor, the first inlet of the third contactor receiving the second liquid source that humidifies the inert gas, the first contactor receives the humidified inert gas at the second inlet of the first contactor.

33. The system of claim 17 wherein the first contactor further comprises a third inlet, the third inlet being in fluid communication with a second liquid source, the third inlet receiving a second liquid based on a concentration of the liquid source at the first inlet of the first contactor.

34. A system to purge dissolved gases selectively from liquids, comprising:
a first contactor including two first contactor inlets and two first contactor outlets, the first contactor being in fluid communication with a liquid source at a first inlet of the first contactor and an inert gas source at a second inlet of the first contactor, the second inlet of the first contactor receiving inert gas that purges a first portion of gas from the liquid source, the first portion of purged gas exiting the first contactor at a first outlet of the first contactor; and
a second contactor including two second contactor inlets and two second contactor outlets, the second contactor being in fluid communication with a second outlet of the first contactor and the inert gas source at a second inlet of the second contactor, the second inlet of the second contactor receiving inert gas that purges a second portion of the gas from the liquid source, the second portion of purged gas exiting the second contactor at a first outlet of the second contactor; and
a plurality of contactors each including two contactor inlets and two contactor outlets, the plurality of contactors being in fluid communication such that a first inlet of a third contactor of the plurality of contactors is in fluid communication with the second outlet of the second contactor,
each first outlet of the plurality of contactors is in fluid communication with a first inlet of one of the plurality of contactors and a second inlet of each of the plurality of contactors is in fluid communication with the inert gas source, the second inlet of each of the plurality of contactors receiving inert gas that purges a portion of gas from the liquid source, each portion of purged gas exiting each of the plurality of contactors at a second outlet of each of the plurality of contactors, and
wherein the last contactor further comprises a third inlet, the third inlet being in fluid communication with an additional gas source such that fluid at the second outlet of the last contactor includes a desired concentration of the additional gas.

35. The system of claim 34 further comprising a liquid jet vacuum pump being in fluid communication with the last contactor via a) a second outlet of a last contactor of the plurality of contractors being in fluid communication with at least one inlet of the liquid jet vacuum pump and b) an outlet of the liquid jet vacuum pump being in fluid communication with the first inlet of the first contactor.

36. The system of claim 35, further comprising a liquid pump being in fluid communication with the second contactor via the second outlet of the last contactor to pressurize fluid exiting the outlet of the last contactor.

37. The system of claim 36, wherein the liquid pump is in fluid communication with the liquid jet vacuum pump to provide a portion of the pressurized fluid to be used as a motivating liquid for the liquid jet vacuum pump.

38. The system of claim 35 wherein the second inlet of the last contactor is in fluid communication with the inert gas source such that a vacuum level of the liquid jet vacuum pump is controlled and the inert gas purges an additional portion of the first gas.

39. The system of claim 34 wherein the first contactor includes a plurality of first contactor inlets and a plurality of first contactor outlets, the liquid source and the inert gas being in fluid communication with one or more of the plurality of first contactor inlets.

40. The system of claim 34 where the second contactor includes a plurality of second contactor inlets and a plurality of second contactor outlets, one or more of the plurality of second contactor inlets being in fluid communication with one or more of the plurality of first contactor outlets and the inert gas source.

41. The system of claim 34 wherein the inert gas source is in fluid communication with the first contactor, the second contactor and the plurality of contactors such that a portion of the inert gas provides an inert blanket gas to the first contactor, the second contactor and the plurality of contactors.

42. The system of claim 34 wherein each portion of purged gas is in fluid communication with the first contactor, the second contactor and the plurality of contactors to provide an inert blanket gas to the first contactor, the second contactor and the plurality of contactors.

43. The system of claim 34 further comprising a housing that surrounds at least a portion of the first contactor, the second contactor and the plurality of contactors, wherein the housing is a material with low permeability.

44. The system of claim 43 wherein inert gas source is in fluid communication with the housing to purge the housing with the inert gas.

45. The system of claim 43 wherein the first portion of gas purged from the liquid source is in fluid communication with the housing to purge the housing with the first portion of gas purged.

46. The system of claim 34 further comprising one or more sensors to measure a concentration of gas at the first outlet of the second contactor, the second outlet of the second contactor, or both the first outlet and the second outlet of the second contactor, the gas is substantially similar to the purged gas.

47. The system of claim 46 further comprising a controller to control the concentration of gas at the second outlet of the second contactor based on the measured concentration by:
a) inputting the purged gas into the second contactor via the second inlet of the second contactor inlet,
b) varying an amount of the inert gas supplied to the first contactor and the second contactor, or
c) any combination thereof.

48. The system of claim 34 further comprising a third contactor including two inlets and an outlet, the third contactor being in fluid communication with a second liquid source at the first inlet of the third contactor, the inert gas source at the second inlet of the third contactor, and the first contactor at the outlet of the third contactor, the first inlet of the third contactor receiving the second liquid source that humidifies the inert gas, the first contactor receives the humidified inert gas at the second inlet of the first contactor.

49. The system of claim 34 wherein the first contactor further comprises a third inlet, the third inlet being in fluid communication with a second liquid source, the third inlet receiving a second liquid based on a concentration of the liquid source at the first inlet of the first contactor.

50. A system to purge dissolved gases selectively from liquids, comprising:
a first contactor including two first contactor inlets and two first contactor outlets, the first contactor being in fluid communication with a liquid source at a first inlet of the first contactor and an inert gas source at a second inlet of the first contactor, the second inlet of the first contactor receiving inert gas that purges a first portion of gas from the liquid source, the first portion of purged gas exiting the first contactor at a first outlet of the first contactor; and
a second contactor including two second contactor inlets and two second contactor outlets, the second contactor being in fluid communication with a second outlet of the first contactor and the inert gas source at a second inlet of the second contactor, the second inlet of the second contactor receiving inert gas that purges a second portion of the gas from the liquid source, the second portion of purged gas exiting the second contactor at a first outlet of the second contactor; and
a third contactor including two inlets and an outlet, the third contactor being in fluid communication with a second liquid source at the first inlet of the third contactor, the inert gas source at the second inlet of the third contactor, and the first contactor at the outlet of the third contactor, the first inlet of the third contactor receiving the second liquid source that humidifies the inert gas, the first contactor receives the humidified inert gas at the second inlet of the first contactor.

51. The system of claim 50 further comprising a liquid jet vacuum pump being in fluid communication with the third contactor via a) a second outlet of the third contactor being in fluid communication with at least one inlet of the vacuum pump and b) an outlet of the vacuum pump being in fluid communication with the first inlet of the first contactor.

52. The system of claim 51 further comprising a liquid pump being in fluid communication with the second contactor via the second outlet of the second contactor to pressurize fluid exiting the outlet of the second contactor.

53. The system of claim 52, wherein the liquid pump is in fluid communication with the liquid jet vacuum pump to provide a portion of the pressurized fluid to be used as a motivating liquid for the liquid jet vacuum pump.

54. The system of claim 50 wherein the first contactor includes a plurality of first contactor inlets and a plurality of first contactor outlets, the liquid source and the inert gas being in fluid communication with one or more of the plurality of first contactor inlets.

55. The system of claim 50 where the second contactor includes a plurality of second contactor inlets and a plurality of second contactor outlets, one or more of the plurality of second contactor inlets being in fluid communication with one or more of the plurality of first contactor outlets and the inert gas source.

56. The system of claim 50 wherein the inert gas source is in fluid communication with the first contactor and the second contactor such that a portion of the inert gas provides an inert blanket gas to the first contactor and the second contactor.

57. The system of claim 50 wherein the first portion of purged gas or the second portion of purged gas is in fluid communication with the first contactor and the second contactor to provide an inert blanket gas to the first contactor and the second contactor.

58. The system of claim 50 further comprising:
a plurality of contactors each including two contactor inlets and two contactor outlets, the plurality of contactors being in fluid communication such that a first inlet of a fourth contactor of the plurality of contactors is in fluid communication with the second outlet of the second contactor,
each first outlet of the plurality of contactors is in fluid communication with a first inlet of one of the plurality of contactors and a second inlet of each of the plurality of contactors is in fluid communication with the inert gas source, the second inlet of each of the plurality of contactors receiving inert gas that purges a portion of gas from the liquid source, each portion of purged gas exiting each of the plurality of contactors at a second outlet of each of the plurality of contactors.

59. The system of claim 58 further comprising a liquid jet vacuum pump being in fluid communication with a last contactor of the plurality of contactors via:
a) a second outlet of the last contactor being in fluid communication with at least one inlet of the liquid jet vacuum pump, and
b) an outlet of the liquid jet vacuum pump being in fluid communication with the first inlet of the first contactor.

60. The system of claim 59 wherein the second inlet of the last contactor is in fluid communication with the inert gas source such that a vacuum level of the liquid jet vacuum pump is controlled and the inert gas purges an additional portion of the first gas.

61. The system of claim 58 wherein the last contactor further comprises a third inlet, the third inlet being in fluid communication with an additional gas source such that fluid at the second outlet of the last contactor includes a desired concentration of the additional gas.

62. The system of claim 50 further comprising one or more sensors to measure a concentration of gas at the first outlet of the second contactor, the second outlet of the second contactor, or both the first outlet and the second outlet of the second contactor, the gas is substantially similar to the purged gas.

63. The system of claim 62 further comprising a controller to control the concentration of gas at the second outlet of the second contactor based on the measured concentration by:
a) inputting the purged gas into the second contactor via the second inlet of the second contactor inlet,
b) varying an amount of the inert gas supplied to the first contactor and the second contactor, or
c) any combination thereof.

64. A system to purge dissolved gases selectively from liquids, comprising:
a first contactor including two first contactor inlets and two first contactor outlets, the first contactor being in fluid communication with a liquid source at a first inlet of the first contactor and an inert gas source at a second inlet of the first contactor, the second inlet of the first contactor receiving inert gas that purges a first portion of gas from the liquid source, the first portion of purged gas exiting the first contactor at a first outlet of the first contactor; and
a second contactor including two second contactor inlets and two second contactor outlets, the second contactor being in fluid communication with a second outlet of the first contactor and the inert gas source at a second inlet of the second contactor, the second inlet of the second contactor receiving inert gas that purges a second portion of the gas from the liquid source, the second portion of purged gas exiting the second contactor at a first outlet of the second contactor,
wherein the first contactor further comprises a third inlet, the third inlet being in fluid communication with a second liquid source, the third inlet receiving a second liquid based on a concentration of the liquid source at the first inlet of the first contactor.

65. The system of claim 64 wherein the first contactor includes a plurality of first contactor inlets and a plurality of first contactor outlets, the liquid source and the inert gas being in fluid communication with one or more of the plurality of first contactor inlets.

66. The system of claim 64 where the second contactor includes a plurality of second contactor inlets and a plurality of second contactor outlets, one or more of the plurality of second contactor inlets being in fluid communication with one or more of the plurality of first contactor outlets and the inert gas source.

67. The system of claim 64 wherein the inert gas source is in fluid communication with the first contactor and the second contactor such that a portion of the inert gas provides an inert blanket gas to the first contactor and the second contactor.

68. The system of claim 64 wherein the first portion of purged gas or the second portion of purged gas is in fluid communication with the first contactor and the second contactor to provide an inert blanket gas to the first contactor and the second contactor.

69. The system of claim 64 further comprising:
a plurality of contactors each including two contactor inlets and two contactor outlets, the plurality of contactors being in fluid communication such that a first inlet of a third contactor of the plurality of contactors is in fluid communication with the second outlet of the second contactor,
each first outlet of the plurality of contactors is in fluid communication with a first inlet of one of the plurality of contactors and a second inlet of each of the plurality of contactors is in fluid communication with the inert gas source, the second inlet of each of the plurality of contactors receiving inert gas that purges a portion of gas from the liquid source, each portion of purged gas exiting each of the plurality of contactors at a second outlet of each of the plurality of contactors.

70. The system of claim 69 further comprising a liquid jet vacuum pump being in fluid communication with a last contactor of the plurality of contactors via:
a) a second outlet of the last contactor being in fluid communication with at least one inlet of the liquid jet vacuum pump, and
b) an outlet of the liquid jet vacuum pump being in fluid communication with the first inlet of the first contactor.

71. The system of claim 70 wherein the second inlet of the last contactor is in fluid communication with the inert gas source such that a vacuum level of the liquid jet vacuum pump is controlled and the inert gas purges an additional portion of the first gas.

72. The system of claim 69 wherein the last contactor further comprises a third inlet, the third inlet being in fluid communication with an additional gas source such that fluid at the second outlet of the last contactor includes a desired concentration of the additional gas.

73. The system of claim 64 further comprising one or more sensors to measure a concentration of gas at the first outlet of the second contactor, the second outlet of the second contactor, or both the first outlet and the second outlet of the second contactor, the gas is substantially similar to the purged gas.

74. The system of claim 73 further comprising a controller to control the concentration of gas at the second outlet of the second contactor based on the measured concentration by:
   a) inputting the purged gas into the second contactor via the second inlet of the second contactor inlet,
   b) varying an amount of the inert gas supplied to the first contactor and the second contactor, or
   c) any combination thereof.

75. A method for purging dissolved gases selectively from liquids, comprising:
   supplying a liquid source and an inert gas to a first contactor to purge a first portion of a gas from the liquid source;
   supplying the inert gas and an output of the first contactor to a second contactor to purge a second portion of the gas from the liquid source;
   supplying an output of the second contactor to a liquid jet vacuum pump to purge dissolved inert gas from a second contactor output; and
   supplying an output of the liquid jet vacuum pump to the second contactor to purge a third portion of the gas from the liquid source.

76. The method of claim 75 further comprising pressurizing fluid exiting the second contactor via a liquid pump.

77. The method of claim 76 further comprising supplying a portion of the pressurized fluid to the liquid jet vacuum pump for use as a motivating liquid for the liquid jet vacuum pump.

78. The method of claim 75 further comprising supplying a second gas to the inert gas to purge a third portion of the gas from the liquid source.

79. The method of claim 75 further comprising controlling a vacuum level of the second contactor to purge a third portion of the gas from the liquid source.

80. The method of claim 75 further comprising:
   supplying the inert gas and an output of the second contactor to a third contactor of a plurality of contactors;
   supplying an output of each of the plurality of contactors to an input of one contactor of the plurality of contactors such that the first contactor, the second contactor and the plurality of contactors are connected; and
   supplying the inert gas to each of the plurality of contactors, the inert gas purging a portion of the gas from each of the plurality of contactors.

81. The method of claim 80 further comprising supplying an output of a last contactor of the plurality of contactors to a liquid jet vacuum pump to purge an additional portion of the first gas from the liquid source.

82. The method of claim 81 further comprising supplying additional inert gas to the last contactor to control a vacuum level of the liquid jet vacuum pump.

83. The method of claim 82 further comprising supplying an additional gas source to an input of the last contactor such that fluid at the output of the last contactor includes a desired concentration of the additional gas.

84. The method of claim 83 further comprising measuring a concentration of gas at the output of the second contactor, the gas is substantially similar to the purged gas.

85. The method of claim 84 further comprising controlling the concentration of gas at the output of the second contactor based on the measured concentration by a) inputting the purged gas into the second contactor, b) varying an amount of the inert gas supplied to the first contactor and the second contactor, or c) any combination thereof.

86. The method of claim 81 further comprising controlling a vacuum level of the liquid jet vacuum pump by varying a water flow to the liquid jet vacuum pump, disabling the liquid jet vacuum pump, or enabling the liquid jet vacuum pump.

87. A method for purging dissolved gases selectively from liquids, comprising:
   supplying a liquid source and an inert gas to a first contactor to purge a first portion of a gas from the liquid source;
   supplying the inert gas and an output of the first contactor to a second contactor to purge a second portion of the gas from the liquid source;
   supplying the inert gas and an output of the second contactor to a third contactor of a plurality of contactors;
   supplying an output of each of the plurality of contactors to an input of one contactor of the plurality of contactors such that the first contactor, the second contactor and the plurality of contactors are connected;
   supplying the inert gas to each of the plurality of contactors, the inert gas purging a portion of the gas from each of the plurality of contactors; and
   supplying an output of a last contactor of the plurality of contactors to a liquid jet vacuum pump to purge an additional portion of the first gas from the liquid source.

88. The method of claim 87 further comprising supplying additional inert gas to the last contactor to control a vacuum level of the liquid jet vacuum pump.

89. The method of claim 88 further comprising supplying an additional gas source to an input of the last contactor such that fluid at the output of the last contactor includes a desired concentration of the additional gas.

90. The method of claim 89 further comprising measuring a concentration of gas at the output of the second contactor, the gas is substantially similar to the purged gas.

91. The method of claim 90 further comprising controlling the concentration of gas at the output of the second contactor based on the measured concentration by a) inputting the purged gas into the second contactor, b) varying an amount of the inert gas supplied to the first contactor and the second contactor, or c) any combination thereof.

92. The method of claim 87 further comprising controlling a vacuum level of the liquid jet vacuum pump by varying a water flow to the liquid jet vacuum pump, disabling the liquid jet vacuum pump, or enabling the liquid jet vacuum pump.

93. The method of claim 87 further comprising pressurizing fluid exiting the second contactor via a liquid pump.

94. The method of claim 93 further comprising supplying a portion of the pressurized fluid to the liquid jet vacuum pump for use as a motivating liquid for the liquid jet vacuum pump.

95. The method of claim 87 further comprising supplying a second gas to the inert gas to purge a third portion of the gas from the liquid source.

96. The method of claim 87 further comprising controlling a vacuum level of the second contactor to purge a third portion of the gas from the liquid source.

97. A method for purging dissolved gases selectively from liquids, comprising:
   supplying a liquid source and an inert gas to a first contactor to purge a first portion of a gas from the liquid source;
   supplying the inert gas and an output of the first contactor to a second contactor to purge a second portion of the gas from the liquid source;
   supplying a second liquid source and the inert gas to a third contactor to humidify the inert gas; and
   supplying the output of the third contactor to the first contactor such that the first contactor receives the humidified inert gas.

98. The method of claim 97 further comprising
   supplying an output of the second contactor to a liquid jet vacuum pump to purge dissolved inert gas from a second contactor output; and supplying an output of the liquid jet vacuum pump to the second contactor to purge a third portion of the gas from the liquid source.

99. The method of claim 98 further comprising pressurizing fluid exiting the second contactor via a liquid pump.

100. The method of claim 99 further comprising supplying a portion of the pressurized fluid to the liquid jet vacuum pump for use as a motivating liquid for the liquid jet vacuum pump.

101. The method of claim 98 further comprising supplying a second gas to the inert gas to purge a third portion of the gas from the liquid source.

102. The method of claim 98 further comprising controlling a vacuum level of the second contactor to purge a third portion of the gas from the liquid source.

103. The method of claim 97 further comprising:
supplying the inert gas and an output of the second contactor to a third contactor of a plurality of contactors;
supplying an output of each of the plurality of contactors to an input of one contactor of the plurality of contactors such that the first contactor, the second contactor and the plurality of contactors are connected; and
supplying the inert gas to each of the plurality of contactors, the inert gas purging a portion of the gas from each of the plurality of contactors.

104. The method of claim 103 supplying an output of a last contactor of the plurality of contactors to a liquid jet vacuum pump to purge an additional portion of the first gas from the liquid source.

105. The method of claim 104 further comprising supplying additional inert gas to the last contactor to control a vacuum level of the liquid jet vacuum pump.

106. The method of claim 105 further comprising supplying an additional gas source to an input of the last contactor such that fluid at the output of the last contactor includes a desired concentration of the additional gas.

107. The method of claim 106 further comprising measuring a concentration of gas at the output of the second contactor, the gas is substantially similar to the purged gas.

108. The method of claim 107 further comprising controlling the concentration of gas at the output of the second contactor based on the measured concentration by a) inputting the purged gas into the second contactor, b) varying an amount of the inert gas supplied to the first contactor and the second contactor, or c) any combination thereof.

109. The method of claim 104 further comprising controlling a vacuum level of the liquid jet vacuum pump by varying a water flow to the liquid jet vacuum pump, disabling the liquid jet vacuum pump, or enabling the liquid jet vacuum pump.

110. A method for purging dissolved gases selectively from liquids, comprising:
supplying a liquid source and an inert gas to a first contactor to purge a first portion of a gas from the liquid source;
supplying the inert gas and an output of the first contactor to a second contactor to purge a second portion of the gas from the liquid source;
supplying a second liquid source to the first contactor based on a concentration of the liquid source at the first contactor.

111. The method of claim 110 further comprising
supplying an output of the second contactor to a liquid jet vacuum pump to purge dissolved inert gas from a second contactor output; and
supplying an output of the liquid jet vacuum pump to the second contactor to purge a third portion of the gas from the liquid source.

112. The method of claim 111 further comprising pressurizing fluid exiting the second contactor via a liquid pump.

113. The method of claim 112 further comprising supplying a portion of the pressurized fluid to the liquid jet vacuum pump for use as a motivating liquid for the liquid jet vacuum pump.

114. The method of claim 111 further comprising supplying a second gas to the inert gas to purge a third portion of the gas from the liquid source.

115. The method of claim 111 further comprising controlling a vacuum level of the second contactor to purge a third portion of the gas from the liquid source.

116. The method of claim 110 further comprising:
supplying the inert gas and an output of the second contactor to a third contactor of a plurality of contactors;
supplying an output of each of the plurality of contactors to an input of one contactor of the plurality of contactors such that the first contactor, the second contactor and the plurality of contactors are connected; and
supplying the inert gas to each of the plurality of contactors, the inert gas purging a portion of the gas from each of the plurality of contactors.

117. The method of claim 116 supplying an output of a last contactor of the plurality of contactors to a liquid jet vacuum pump to purge an additional portion of the first gas from the liquid source.

118. The method of claim 117 further comprising supplying additional inert gas to the last contactor to control a vacuum level of the liquid jet vacuum pump.

119. The method of claim 118 further comprising supplying an additional gas source to an input of the last contactor such that fluid at the output of the last contactor includes a desired concentration of the additional gas.

120. The method of claim 119 further comprising measuring a concentration of gas at the output of the second contactor, the gas is substantially similar to the purged gas.

121. The method of claim 120 further comprising controlling the concentration of gas at the output of the second contactor based on the measured concentration by a) inputting the purged gas into the second contactor, b) varying an amount of the inert gas supplied to the first contactor and the second contactor, or c) any combination thereof.

122. The method of claim 117 further comprising controlling a vacuum level of the liquid jet vacuum pump by varying a water flow to the liquid jet vacuum pump, disabling the liquid jet vacuum pump, or enabling the liquid jet vacuum pump.

* * * * *